UNITED STATES PATENT OFFICE 2,324,254

METHOD OF REMOVING MUD BARRIERS FROM OIL WELLS

Theodore A. Bertness, Whittier, Norris Johnston, Alhambra, and Daniel O. Newton, La Habra Heights, Calif., assignors to Socony-Vacuum Oil Company, Incorporated, New York, N. Y., a corporation of New York No Drawing. Application March 11, 1941, Serial No. 382,758

1 Claim. (Cl. 166—24)

When oil wells are drilled through the producing formation in the customary manner, with the use of an aqueous mud fluid, it commonly occurs that a mud sheath is left on the wall of the hole. The drilling fluid adjacent porous formations is likely to lose water by absorption and thus to become densely packed and consolidated, forming a barrier to the subsequent flow of oil into the hole.

It is customary to remove as much of this barrier as possible before putting the well on production, as for example by simple washing through the perforations with streams of water, by the use of acid (which tends to flocculate the cake) and by the use of water softening agents.

None of these treatments appears to be fully successful, and we propose a novel treatment which consists in substantially dehydrating the mud sheath and thereby causing it to shrink and crack into blocks, to curl and loosen from the proper well wall, and to become dislodged as oil from the formation acts against its under side during the cleaning-out operation.

The effectiveness of this dehydrating step is much promoted by the presence in most modern drilling fluids of material proportions of colloidal clay or bentonite, which gelatinizes and expands enormously when wetted and has a correspondingly high shrinkage factor when dried.

The removal of the mud sheath from the walls of the hole on zones to be cemented is also desired so as to insure a good seal between the wall and the cement. The complete breaking up of the mud sheath by dehydrating agents, preceding cementing operations, will allow a successful seal between the wall and the cement.

The dehydrating operation may be performed by agents of various types, viz:

(a) Non-aqueous, oil-soluble, water-absorbing liquids such as acetone, methyl-ethyl ketone, isopropyl alcohol, n-propyl alcohol, tertiary butyl alcohol, diethylene glycol monobutyl ether, ethylene glycol monobutyl ether, diethylene glycol monoethyl ether, diethylene glycol monoethyl ether acetate, ethylene glycol monoethyl ether, 4-hydroxy-4-methyl-pentanone-2, diethyl ether of diethylene glycol, dimethyl ether of tetraethylene glycol, ethylene glycol monomethyl ether, 1–4 diethylene dioxide, glycerine, and diethylene glycol.

(b) Aqueous dehydrating agents such as highly concentrated calcium chloride brine.

(c) Hot dry crude oil.

In the use of dehydrating agents of the first or second class, the portion of the well from which the mud sheath is to be removed is filled with the agent and allowed to stand for some hours, the quantity being replenished if the level subsides by infiltration into the formation. When it is thought that the desired effect has been attained, the liquid agent is bailed out and the dislodged clay cakes removed by cleaning out with oil in the usual manner, or if used on zones to be cemented, the dehydrating agents are followed by the cementing operations.

In the use of hot crude oil, the oil is heated to such temperatures that it will reach the location in which it is to be used at a temperature above the static subsurface temperature. The hot oil is then circulated down the drill pipe or tubing and up through the casing for a considerable time, or until it no longer brings up cakes or fragments of desiccated mud. In this modification the final cleaning-out step is avoided or much shortened.

We claim as our invention:

The method of removing mud barriers from oil wells which comprises: removing the drilling fluid from the well; filling a desired portion of the well bore with a highly concentrated calcium chloride brine; allowing said brine to stand in contact with said barrier until the mud thereof is at least partially dehydrated and disintegrated; and removing from the well said brine and the earthy matter disintegrated thereby.

THEODORE A. BERTNESS.
NORRIS JOHNSTON.
DANIEL O. NEWTON.